Patented June 7, 1932

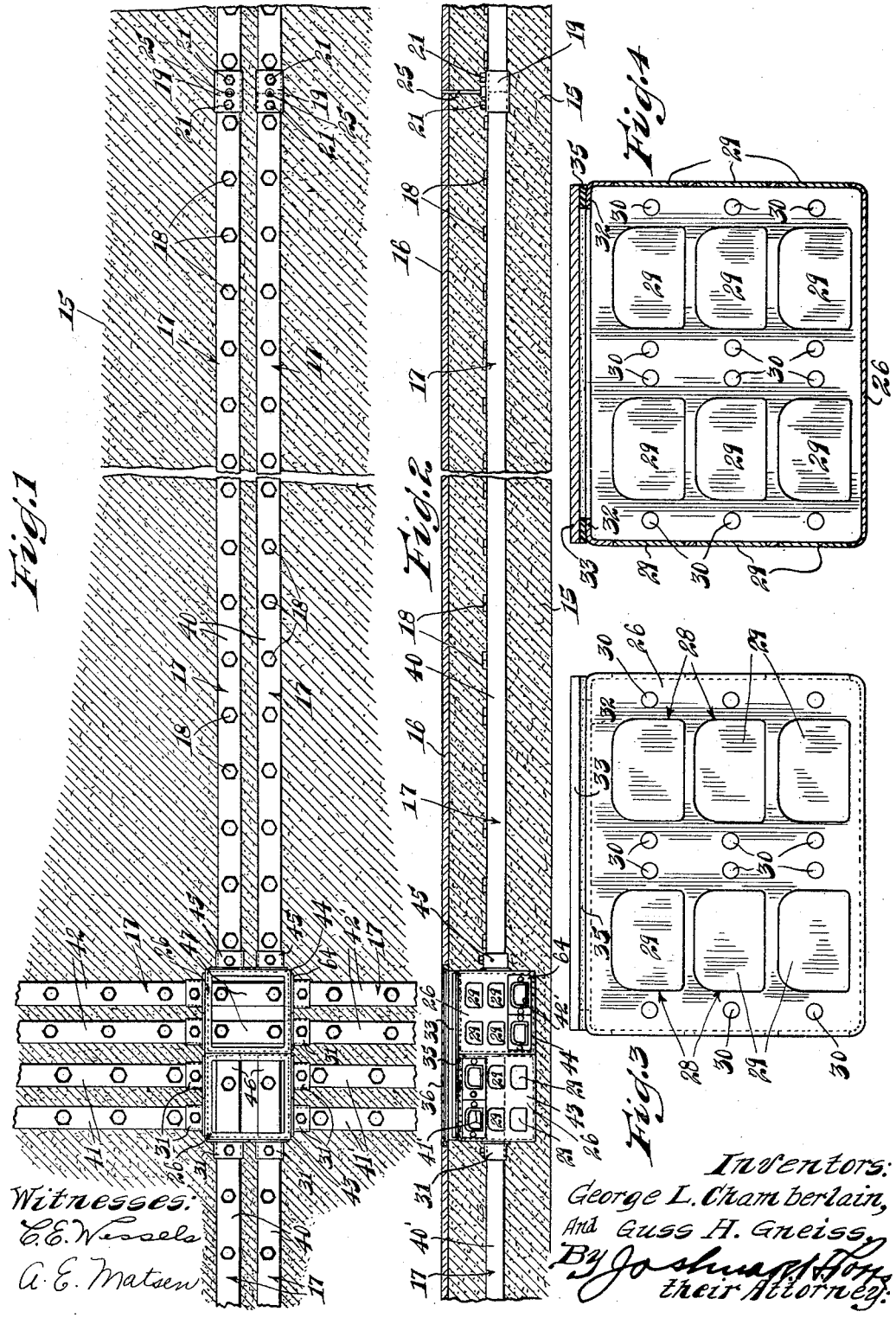

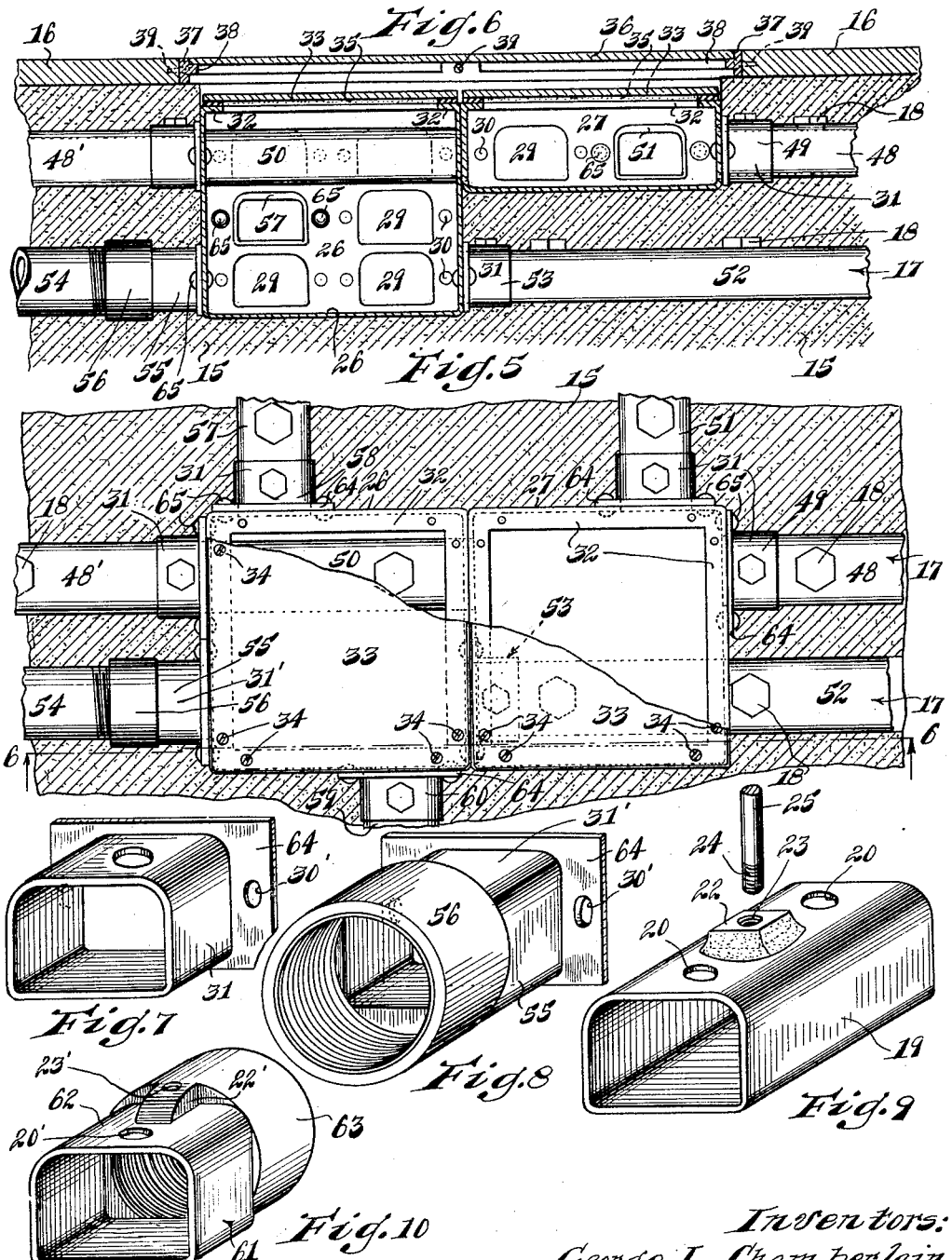

1,861,435

UNITED STATES PATENT OFFICE

GEORGE L. CHAMBERLAIN AND GUSS H. GNEISS, OF CHICAGO, ILLINOIS; SAID GNEISS ASSIGNOR TO SAID CHAMBERLAIN

CONCEALED ELECTRICAL CONDUIT SYSTEM

Application filed July 8, 1929. Serial No. 376,768.

This invention relates to systems of electrical wiring, and more particularly to a conduit or duct system of the undersurface or concealed type for installation in the floors, walls or partitions of buildings during the course of construction thereof.

In the present-day office and commercial building structures in particular, it is desirable and customary to provide for different kinds of electrical service. High tension energy for lighting and power devices is especially required, and in addition thereto, telephone wiring is necessary and also wiring for relatively low tension signal systems, such as buzzers, annunciators, and the like. Obviously, the conductors or wires for these different service utilities should be contained in separate conduits or ducts as a measure of safety, and also to avoid confusion.

The present invention has for its principal object to improve generally upon conduit or duct systems of this character, to provide for the installation of the conduits or ducts in the floor or wall without unduly weakening the structure; to facilitate subsequent changes in the location of outlets for the different classes of service, and to attain certain advantages as will hereinafter more fully appear.

The invention consists principally in the novel unitary duct sections and the particular coupling elements for the jointures thereof, but more particularly the characteristic junction boxes for facilitating the crossing of different ducts without interference, as well as serving to join together the meeting duct sections and for facilitating the drawing of the wires, and for other purposes for which the ordinary junction box is utilized. The invention further consists in the parts and combinations and arrangements of parts as hereinafter described and pointed out with particularity in the appended claims.

In the accompanying drawings, forming part of this specification, and illustrating practical adaptations of the invention,—

Fig. 1 is a fragmentary view in top plan and more or less diagrammatically illustrating a portion of a conduit system in which is employed parallel pairs of ducts laid in separate planes and connected to a cooperating pair of junction boxes, illustrating one method of crossing the ducts;

Fig. 2 is a section through the floor structure showing portions of the duct system in side elevation;

Fig. 3 is a side view of a junction box detached;

Fig. 4 is a cross section through said junction box;

Fig. 5 is a fragmentary horizontal section through a floor structure in the region of a pair of cooperating junction boxes, one of which is deep and the other shallow, and showing a modified arrangement of ducts in connection therewith;

Fig. 6 is a section on the line 6—6 of Fig. 5;

Fig. 7 is a detailed perspective view of a fitting for attaching a rectangular duct section to the junction box;

Fig. 8 is a similar view of a modified form of fitting for attaching a round conduit pipe to the junction box;

Fig. 9 is a perspective view of a coupling sleeve for joining two rectangular duct sections endwise together; and Fig. 10 is a similar view of a modified coupling for joining a rectangular duct section to a round pipe conduit section.

Referring now to the drawings, the numeral 15 designates an ordinary concrete floor structure having a finishing surface of wood or other suitable material 16. Embedded in the concrete floor body 15 is a conduit or duct system, which will now be generally described as comprising duct sections 17, which are generally rectangular in cross section, and preferably of definite unitary lengths, said sections being provided in the upper wall with a series of outlet openings which are normally closed by removable plugs 18. Said plugged openings are preferably located at regular predetermined distances apart, and the endmost openings of each section being located at a definite distance from the adjacent end of the section. The respective duct sections 17 are connectible at their meeting ends by coupling sleeves 19 having openings 20 for the reception of securing screws 21 which engage threaded apertures provided therefor in the adjacent end portions of the duct sections. The coupling elements 19 are provided with bosses 22 having screw-threaded openings 23 for the reception of the screw-threaded end portions 24 of marker rods 25, which latter extend upward through the floor and are visible at the surface thereof, said markers being provided for the purpose of determining the place on the surface of the floor at which to drill an opening through the floor to gain access to a particular plugged opening 18 which it may be desirable to tap for the application of an outlet fixture. That is to say, said markers being coincident with the meeting ends of two joined duct sections and the distance between the respective plugged outlet openings of the duct sections being at known distances apart, according to the adopted standard, it is an easy matter to trace the longitudinal axis of the pipe sections between two of said markers, and, by measuring from one of the markers, to locate the concealed plugged outlet opening it is desired to tap. This particular feature of the invention per se forms the subject-matter of a separate application, and is only set forth and claimed herein insofar as it concerns the present invention.

The numeral 26 designates a unitary junction box which is relatively deep, and the numeral 27 a similar box which is relatively shallow (see Fig. 6 of the drawings). In Figs. 3 and 4 the relatively deep junction box is illustrated more in detail. As shown, this box is square and is provided in each side wall with a plurality of openings 28 of exact dimensions and corresponding to the external cross-sectional contour of the duct sections 17. These openings are normally closed by water-tight knockouts 29. That is to say, the openings are normally closed by the members 29 which are either partially severed all around from the wall, or have been punched from the wall and refitted tightly in the openings, so as to be readily removed when occasion requires. Associated with the respective knockouts 29 are smaller knockouts 30 which provide the openings for the reception of bolts for attaching fitting members 31, through which latter the duct sections are joined to the junction box.

The relatively deep junction box illustrated in Figs. 3 and 4 of the drawings is provided with the knockout openings in three different planes, whereas the shallow box illustrated in Fig. 6 has openings in but a single plane, said shallow box being otherwise identical in structure with the deeper box. Both boxes are open at their tops and are provided with inturned marginal flanges 32, on which a cover plate 33 is secured, preferably by screws 34, as shown in Fig. 5. A gasket 35 is preferably interposed between said cover plate 33 and flange 32 for the purpose of making a water-tight joint. In some cases, the junction boxes will be embedded in the floor so that the cover plate 33 will come flush with the surface of the floor. However, in most cases, the box will be located deeper and, of course, it will be necessary to provide a supplemental cover plate 36 which may be more or less ornamental, as may be desired, said supplemental plate being supported in a frame 37 secured in the registered opening of the floor finishing material 16. This frame has an internal flange 38 on which the cover plate 36 rests, and the frame will be secured in the flooring material 16 by any suitable means, preferably by cutting away portions of the flange 38 at intervals and providing apertures in the frame at those places for the reception of screws 39.

As hereinbefore stated, the junction boxes 26 and 27 are important features of the present invention in that they not only provide openings at the junctions of the respective conduits for pulling wires and splicing connections, but further obviate the necessity for providing separate special crossover boxes or fittings, and they may be used singly or grouped in cooperative multiples or gangs, and the relatively deep and shallow boxes may be used to advantage in connection with each other in many cases. By having the respective openings 28 in the boxes 26 and 27 of the same shape and dimensions as the transverse dimensions of the duct sections 17, the latter may be projected through said openings into the boxes, as said duct sections 17 have no external protuberances other than the heads of the plugs 18, which plugs are removable.

Many different combinations and arrangements of the junction boxes are possible and adaptable to various structural ideas, particularly to permit at least conduits in two different planes to enter, and also to permit crossovers to be made where gang boxes are desirable and may be conveniently used.

In Figs. 1 and 2 of the drawings an installation is illustrated wherein a pair of the relatively deep junction boxes 26 are employed in connection with the parallel ducts which are laid in the floor in three different planes, the ducts in two different planes being crossed. As shown, one pair of ducts, designated by the numeral 40, extends through the floor 15 in one direction at an intermediate level, while two other parallel sets of ducts 41 and 42, respectively, extend in a transverse direction and in planes respectively above and below the plane of the ducts 40. In this particular illustration the junction boxes will be respectively designated by the numerals 43 and 44.

The ducts 40 are joined at their ends 45 to the box 44 by the fitting members 31 and communicate directly with the interior of said box 44. The meeting end portions of the duct sections 40′, which latter constitute continuations of the ducts 40 in the installation, are extended through the fittings 31 at the opposite far side of the adjoining box 43, the extreme end portions 46 of said ducts 40' terminating in the corresponding openings 28 in the meeting walls of the two boxes 43 and 44. The ducts 41, which are in the plane above the ducts 40, are attached to the box 43 by the fittings 31 and open directly into said box, and the extensions 41' of said ducts 41 likewise terminate at the opposite wall of said box 43. It will thus be seen that access to the wires that are carried in the ducts 40, 40', is gained through the box 44, while the wires of the ducts 41, 41', are accessible through the box 43. The ducts 42 or the continuations 42', which are in a plane below the plane of the ducts 40, 40', are extended through the box 44, as at 47.

A further example of a practical installation according to the present invention is illustrated in Figs. 5 and 6 of the drawings. In this modification, a relatively deep junction box 26 and a shallow box 27 are employed. At an upper level in the floor 15 (see Fig. 6) is a duct 48 which is joined to the shallow box, as at 49, through the usual fitting 31. This duct is in direct communication with the interior of the shallow box 27, and a continuation 48' of said duct 48 is likewise in communication with said shallow box 27, it being extended, as at 50, through the upper portion of the relatively deep box 26 and terminating in the corresponding registered openings in the meeting walls of the two boxes. A transversely extending duct 51 also communicates with the interior of said shallow box 27 in a manner similar to the duct 48 and, of course, said ducts 48 and 51 are for the accommodation of wires for the same character of service.

Extending in a plane below the plane of the duct 48 and to one side thereof is a duct 52, which is passed under the shallow box 27 and joins the relatively deep box 26, as at 53, through the regular fitting 31, and in line with this duct 52 is a duct 54 which, by way of illustration, is of round instead of rectangular cross section, and is connected to the box 26 by the specially adapted fitting 55 which has a portion 31' similar to the fitting 31 for the rectangular duct, and an internally screw threaded socket portion 56 for the reception of the correspondingly threaded end portion of said round duct 54. A transversely extending duct 57, in a plane midway between the planes of the ducts 48, 48' and 52, 54, is attached to the relatively deep box 26, as at 58, and communicates with the interior thereof, and also communicating with said box at the opposite side thereof, but in the same plane with the duct 57 is a duct 59 (see Fig. 5) which is attached to the box 26, as at 60. In this particular illustration the ducts 52, 54, 57 and 59 are for the accommodation of wires for the same character of service.

While one of the primary objects of the present invention is to utilize more particularly ducts of rectangular cross section, there may be conditions where it is necessary or desirable to utilize, in certain parts of the system, ducts of round section which may be incorporated as illustrated in Figs. 5 and 6 in connection with the junction boxes, and to further facilitate the use of such ducts a special coupling 61 may be provided, said coupling having a substantially rectangular portion 62 similar to the coupling sleeve 19, and an internally screw-threaded socket portion 63 for the reception of the correspondingly screw threaded end portion of a round duct. This element 61 is provided with an aperture 20' similar to the aperture 20 in the coupling sleeve 19, and a boss 22' having a screw-threaded aperture 23' for the reception of the screw-threaded end portion 24 of the marker rod 25, said element 61 and its associated parts being used for the same purpose as the coupling sleeve 19, the only difference being that the sleeve 19 joins two like rectangular duct sections, whereas the element 61 is a special adapter for connecting a rectangular and a round duct section. The attaching fittings 31 and 55 are also alike insofar as their particular means of attachment to the junction boxes 26 and 27 is concerned. Both of these devices have flanged end portions 64 in which are provided apertures 30' to register with the knockout apertures 30 in the side walls of the respective junction boxes for the reception of the securing bolts or rivets 65, which latter are best shown in Figs. 5 and 6 of the drawings.

Obviously, the structure and application of the different elements of the system herein described admit of considerable modification without departing from the spirit and scope of the invention as defined by the appended claims. The invention, therefore, is not limited to the specific details of structure nor to the particular application thereof illustrated in the accompanying drawings.

Having thus described our invention, what we claim as new and desire to secure by Letters Patent is:

1. A concealed wiring system for concrete building structures, the same comprising duct tubes embedded within the body of the structure beneath the surface thereof, and junction boxes likewise embedded and having openings in the walls thereof with means adjacent for the attachment of said duct tubes terminally to said boxes at the openings thereof for direct communication with the interior of said boxes, said duct tubes also being capable of continuation completely across said boxes through the wall openings thereof without communication between said ducts and the interior of said boxes.

2. In a duct system of the character described, unitary rectangular junction boxes without interior division walls, said boxes having registrable openings provided with removable closures in their side walls for joining the boxes in cooperative communicable relation and for the attachment of tubular duct members terminally whereby to communicate with the interior of the boxes and for the extension of selected duct members through the boxes without communication between them.

3. A concealed wiring system for concrete building structures, the same comprising duct tubes disposed in different parallel planes and cooperating junction boxes embedded within the body of the structure beneath the surface thereof, said junction boxes being polygonal and having alined openings in their opposed side walls in the same planes as said duct tubes and having provision adjacent to said openings for attaching the tubes terminally to the boxes in direct communication with the interior thereof, selected tubes being continued completely across the boxes through the corresponding alined wall openings without communication between the tubes and the interior of the boxes.

4. A concealed wiring system for concrete building structures, the same comprising duct tubes and cooperating junction boxes embedded within the body of the structure beneath the surface thereof, said duct tubes being disposed in different parallel planes and said junction boxes being polygonal and of different dimensions in depth but of the same dimensions in width and length and having openings in their side walls of the same dimensions as the transverse dimensions of said duct tubes and located in the same planes as said tubes, selected tubes being continued completely across the boxes through alined opposite wall openings, and means for attaching said junction boxes sidewise together and for attaching the duct tubes to the boxes terminally coincident with the wall openings thereof and in extended relation through said openings.

5. In a duct system of the character described, a plurality of unitary duct tube sections, and unitary polygonal junction boxes of like dimensions in width and length but differing in depth and having openings in the opposite side walls thereof of form and dimensions corresponding to the transverse external contour of the duct tube sections, said boxes being without interior division walls and being capable of sidewise attachment to each other with their adjacent wall openings cooperatively registered, said duct tube sections being attachable terminally to said junction boxes in communicable registration with the wall openings thereof and being capable of continuation across said boxes without communicating therewith.

6. In a duct system of the character described, a plurality of unitary duct tube sections, unitary square junction boxes of like dimensions except as to depth, said boxes having openings in the side walls thereof of form and dimensions corresponding to the transverse external contour of the duct sections, said boxes having provision in the region of said openings for joining them together in cooperative relation to each other and for the attachment of said duct tube sections thereto, said duct tube sections being attachable terminally to said boxes in direct communication with the interior thereof and being capable of continuation through said wall openings and across the boxes without communicating with the interior thereof, said wall openings being located in different planes so that said duct tube sections may be correspondingly laid in a floor structure so as to cross each other without deviating from their normal planes.

7. In a duct system for electrical wiring, cooperatively attachable unitary junction boxes of rectangular form and of different depths but of like dimensions in width and length and being without internal division walls, said boxes having side wall openings in different horizontal planes and provided with removable closures, said openings being of form and dimensions corresponding to the transverse outer contour of tubular duct members, means for attaching said junction boxes together wall to wall with the wall openings thereof in register, and means for attaching selected duct members terminally to the walls of said boxes in direct communication with the interior of the boxes, selected duct members being extended across the boxes through the registered and alined openings thereof without interior communication therewith.

In testimony whereof we have signed our names to this specification.

GEORGE L. CHAMBERLAIN.
GUSS H. GNEISS.